United States Patent

[11] 3,584,552

| [72] | Inventors | Michael S. Montalto;<br>William H. Horton; James E. Dierks, all of Rochester, N.Y. |
|---|---|---|
| [21] | Appl. No. | 731,058 |
| [22] | Filed | May 22, 1968 |
| [45] | Patented | June 15, 1971 |
| [73] | Assignee | Eastman Kodak Company<br>Rochester, N.Y. |

[54] AN INDEXING MECHANISM FOR A FLASH CAMERA
7 Claims, 10 Drawing Figs.

[52] U.S. Cl. .................................................. 95/11, 240/37.1
[51] Int. Cl. .................................................. G03b 15/03
[50] Field of Search .......................................... 95/11, 11.5, 11 L, 31; 240/1.3, 37, 37.1

[56] References Cited
UNITED STATES PATENTS

| 3,319,547 | 5/1967 | Parsons et al. | 95/11 |
| 3,369,468 | 2/1968 | Sapp et al. | 95/11.5 |
| 3,443,497 | 5/1969 | Bihlmaier | 95/11 |

FOREIGN PATENTS

| 1,261,747 | 2/1968 | Germany | 95/11 |

*Primary Examiner*—John M. Horan
*Assistant Examiner*—Fred L. Braun
*Attorneys*—Robert W. Hampton and William C. Dixon, 3rd ABSTRACT: An indexing mechanism for a flash device in a photographic camera which utilizes the shutter driver as a coordinating member for effecting simultaneous winding of film, cocking of the shutter mechanism and indexing of the flash device. The shutter driver positively translates the film-winding force to the flash device to index the flash device and cock the driver. The driver then remains in its cocked position permitting further film-winding without further indexing. Upon release, the drive moves substantially independently of the indexing mechanism.

PATENTED JUN 15 1971

MICHAEL S. MONTALTO
WILLIAM H. HORTON
JAMES E. DIERKS
*INVENTORS*

BY William C. Dixon, III
Robert W. Hampton

ATTORNEYS 3,584,552

MICHAEL S. MONTALTO
WILLIAM H. HORTON
JAMES E. DIERKS
    INVENTORS

BY
ATTORNEYS

MICHAEL S. MONTALTO
WILLIAM H. HORTON
JAMES E. DIERKS
*INVENTORS*

BY *William C. Orton*
*Robert W. Hampton*

ATTORNEYS 3,584,552

AN INDEXING MECHANISM FOR A FLASH CAMERA

BACKGROUND OF THE INVENTION

1. Field of the Invention

This invention relates to flash photography, and more particularly to photographic still cameras with built-in photoflash systems for accepting multilamp photoflash packages such as flashcubes.

2. Description of the Prior Art

There has been developed a disposable multilamp photoflash unit or package having a plurality of photoflash lamps, as disclosed, for example, in U.S. Pat. No. 3,327,105. Cameras for receiving such a package, commonly known as a flashcube, and mechanisms for automatically indexing a received flashcube to successively place a fresh or unfired lamp in a flash firing position also have been developed. In one such camera, as disclosed in U.S. Pat. No. 3,353,467, there is provided means for automatically indexing the flashcube by rotating the receiving socket after an exposure by a socket drive spring energized during the camera setting operation for such exposure.

SUMMARY OF THE INVENTION

The present invention comprises an improved flashcube socket drive mechanism that indexes the flashcube during the camera setting operation. The camera is set for operation in response to operation of the film-winding mechanism, which cocks the shutter driver and indexes the flashcube through the driver. According to a preferred embodiment the present invention, flashcube socket indexing is accomplished by a flexible drive member which is moved to a position of driving engagement with the socket during camera operation and which then rotates the socket during camera setting. In the preferred embodiment, the flexible drive member also acts as a detent to aid manual positioning of the flashcube after the camera has been set.

The various objects and advantages of this invention will become apparent in the detailed description of the illustrated preferred embodiment appearing below, and the novel features thereof will be particularly pointed out in connection with the appended claims.

BRIEF DESCRIPTION OF THE DRAWINGS

In the preferred embodiment described below, reference is made to the accompanying drawings, in which.

DESCRIPTION OF THE PREFERRED EMBODIMENT

Figure 1:
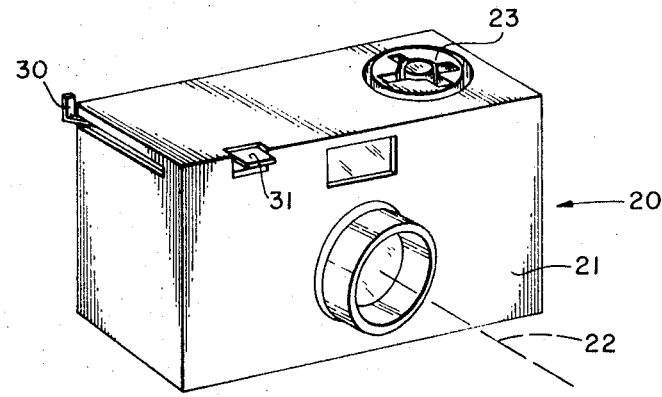
FIG. 1 is a perspective view of a photographic still camera embodying the present invention.

With reference to FIG. 1, there is shown a photographic rollfilm still camera 20 comprising a lighttight camera body 21 having a picture-taking or lens axis 22 about which are located the usual objective focusing lens and film support for holding a roll of photosensitive film (not shown). The shutter cooperating with the present invention, to be described in more detail below, is positioned so as to be in operative relationship with the axis 22 in a manner known per se. Since photographic cameras are well known in the art, the present invention will be described only in relation to those elements forming part of the invention or in direct cooperation therewith, it being understood that the remaining camera components may be selected from those that are known.

Accessibly located at the top wall of the camera body 21 is a multilamp-package-receiving socket 23 designed to receive a disposable, multilamp photoflash unit, or flashcube. Such a flashcube is more fully described in the aforementioned U.S. Pat. No. 3,327,105. Briefly, however, the flashcube includes a plurality (four) of photoflash lamps (AG-type) ordinately mounted in a vertical position about a vertical axis of rotation on a substantially square base, each lamp having a portion extending below the base to be selectively engageable with lamp firing means such as electrical terminals. An individual light reflector is positioned behind each lamp, and an overall, light-transmitting, protective cover is provided. The base defines four lamp sides and includes a depending center connecting post. The socket 23 defines an opening, corresponding to the shape of the connecting post, for receiving the package in any one of four predetermined positions in which one of the lamps is in position for engagement with the lamp firing means.

FILM-WINDING AND SHUTTER-ACTUATING MECHANISMS

To wind the rollfilm along the film plane for placing successive film frames in position for exposure, there is provided an accessible film-winding lever 30 that is rotatable about a pivot 28. The lever 30 also sets the camera's shutter-operating mechanism, which is released by an accessible shutter-trigger or body-release member 31 to expose the positioned film frame by admitting light to the camera's interior along the axis 22 for a predetermined period.

Figure 2:
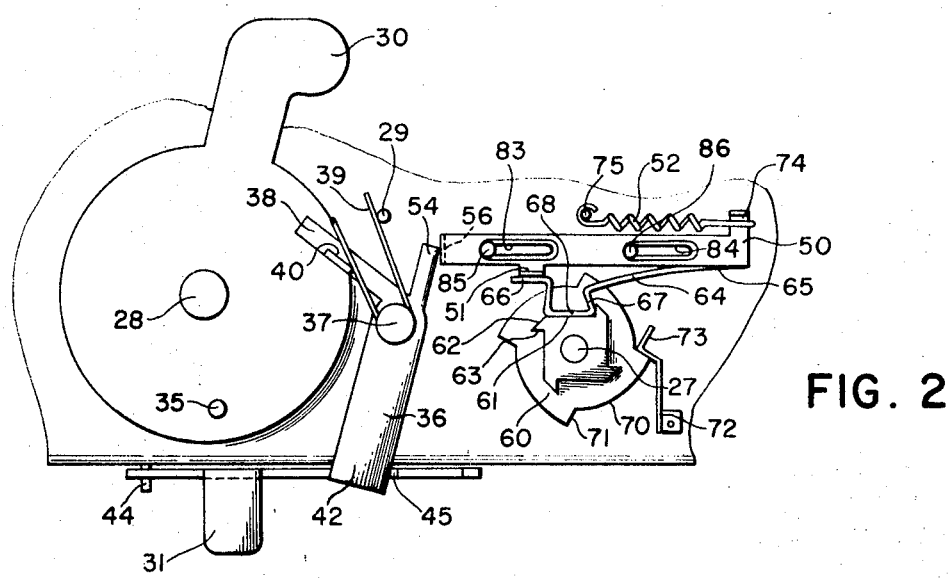
FIG. 2 is a top plan view showing the preferred embodiment of the flashcube socket indexing mechanism according to the present invention after the camera has been set.

Winding lever 30 operates a known film-winding mechanism such as a pawl-and-ratchet assembly or clutch arrangement connecting the lever to a film-takeup spool. As shown in FIG. 2, the winding lever 30 also includes a shutter cocking pin 35 which acts to set the shutter mechanism as the film is being wound.

Figure 3:
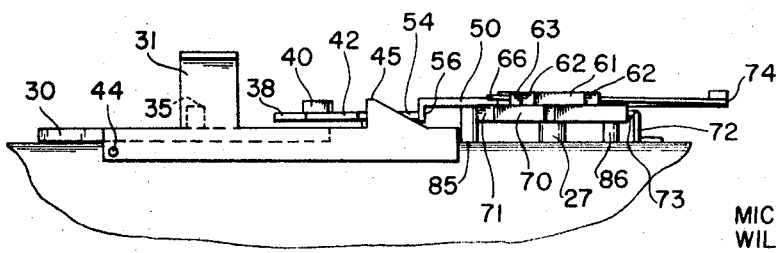
FIG. 3 is a front view of the elements shown in FIG. 2.

A suitable shutter mechanism according to the present invention comprises a shutter-striking plate or driver 36 which rotates about a pivot 37. An arm 38 on the striking plate or driver 36 is engaged by cocking pin 35, whenever the winding lever 30 is operated, to move driver 36 clockwise, as viewed in FIG. 8, against the bias of a strong spring 39 retained between tab 40 of arm 38 and pin 29 attached to camera body 21. The shutter itself comprises a pivotable impact shutter blade (not shown) having an ear in the path of a second arm 42 on driver 36. A weaker spring (not shown) normally holds the shutter blade in a position covering the exposure aperture, and a latch 45 on the shutter-trigger member 31 is normally in the path of movement of arm 42 to prevent shutter operation until trigger member 31 is depressed. Upon release of cocked driver 36, by depressing trigger member 31 and thereby pivoting member 31 about pin 44 in a clockwise direction, as viewed in FIG. 3, against a retaining spring (not shown), compressed spring 39 causes arm 42 of driver 36 to move to the right, as viewed in FIGS. 2 and 3, striking the ear of the shutter blade (not shown) and moving the shutter blade away from the exposure aperture against the bias of the shutter-blade spring (not shown) for the predetermined exposure period, the shutter blade subsequently returning to cover the aperture by operation of the shutter-blade spring.

According to the invention, the package-receiving socket 23 (and inserted flashcube) is automatically indexed or repositioned to place a fresh lamp in its operative position during the camera setting operation. In the embodiment shown, a slider 50, slidably mounted by means of slots 83 and 84 therein receiving pins 85 and 86 attached to camera body 21, is biased to the left, as viewed in FIG. 2, by a slider return spring 52 secured at one end to extension 74 of slider 50 and at the other end to pin 75 attached to camera body 21. Slider 50 is energized, as the shutter is cocked and the film is wound, by a third arm 54 on driver 36 engaging a tab 56 on slider 50 and moving slider 50 to the right, as viewed in FIG. 8.

The socket drive mechanism further includes a disc 60 that is rotatable about a pivot 27 and forms the lower part of flashcube socket 23. Disc 60 includes a plurality (four) of inner ratchet teeth, each comprised of inner-ratchet-tooth surfaces 61, 62, and 63, that are engageable by a flexible spring drive member 64 attached at end portion 65 to slider 50.

Figure 6:
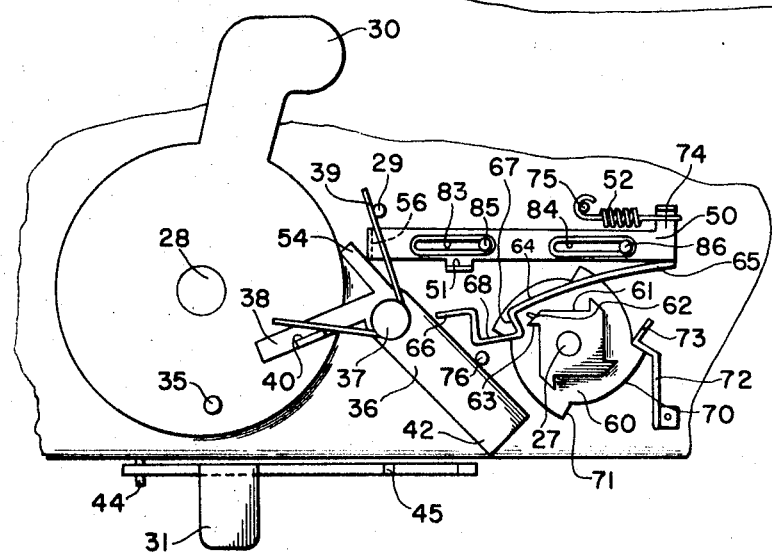
FIGS. 6 and 7 are top plan and front views, respectively, showing the mechanism of FIGS. 2 and 3 just after camera operation but before the camera has been reset.
Figure 8:
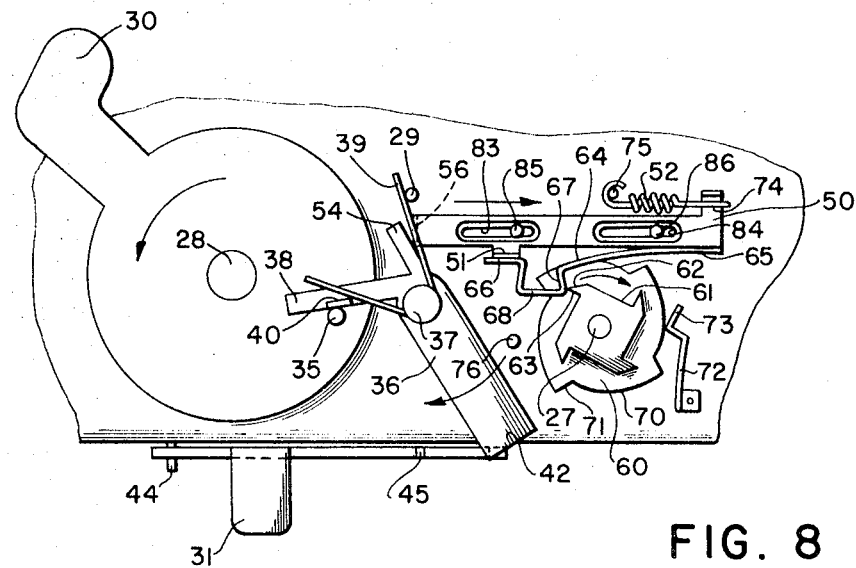
FIGS. 8 and 9 are top plan and front views, respectively, showing the mechanism of FIGS. 2 and 3 when the camera is being reset.
Figure 9:
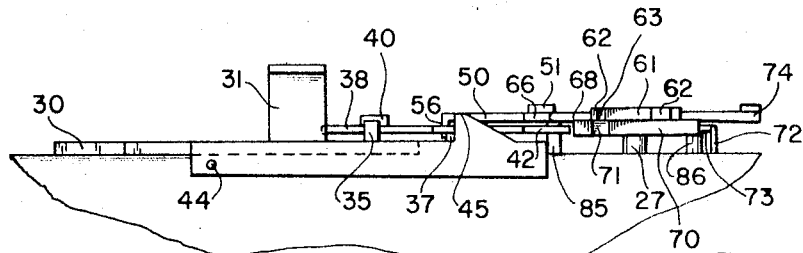

As winding lever 30 is operated by moving it in a counterclockwise direction, as viewed in FIG. 8, driver arm 54 engages tab 56 and moves slider 50 from its unenergized position, shown in FIG. 6, to its fully energized position, shown in FIG. 2. During this movement, as shown in FIG. 8, surface or bend 67 of drive member 64 engages the corner between surfaces 62 and 63 of the adjacent inner ratchet tooth on disc 60 and thereby rotates disc 60 of socket 23 clockwise by 90°, member 64 being retained in its engaged position by the abutment of end portion 66 of member 64 against tab 51 of slider 50.

At the periphery of disc 60 are defined a plurality (four) of outer ratchet teeth, each comprised of outer-ratchet-tooth surfaces 70 and 71, that are engageable by pawl 73 of an antibackup spring 72 to aid in the proper positioning of socket 23 during indexing. Flexible spring drive member 64 further includes a portion or bend 68 which abuts resiliently against surface 61 of the adjacent inner ratchet tooth on disc 60 whenever the socket has been rotated by member 64 to locate a subsequent lamp of the attached package in its operating position.

Figure 4:
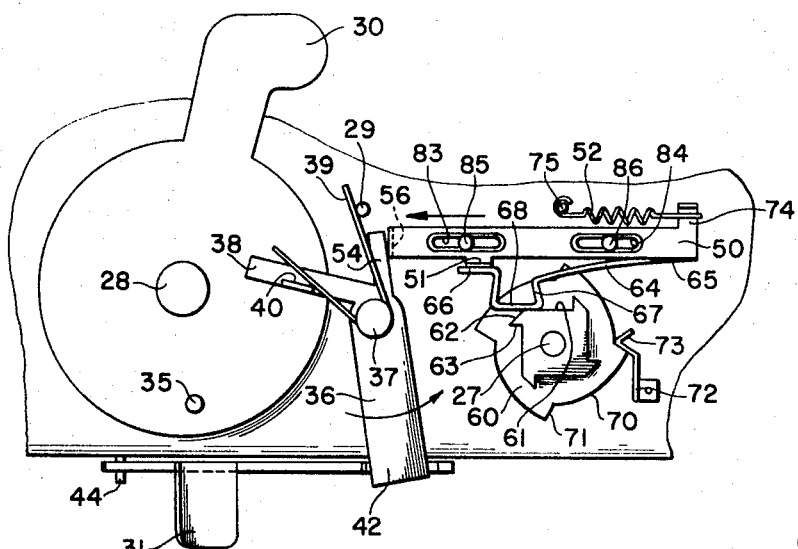
FIGS. 4 and 5 are top plan and front views, respectively, showing the mechanism of FIGS. 2 and 3 just after the camera trigger has been depressed.

During camera operation, slider return spring 52 returns slider 50 to its unenergized position, shown in FIG. 6, thereby causing portion 68 of member 64 to slide to the left on surface 61 of the adjacent inner ratchet tooth on disc 60, as shown in FIG. 4. As stated, shutter operation is controlled by a release latch 45 on trigger member 31, depression of which releases driver 36 to rotate counterclockwise, as viewed in FIG. 4, thereby permitting slide 50 to move to the left by the urging of drive spring 52.

Figure 10:
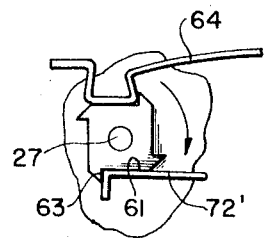
FIG. 10 is a top plan view of another embodiment of the present invention, showing only those parts of the mechanism of FIGS. 2 and 3 that differ therefrom.

A simplified design of the rotatable disc 60, forming the lower part of socket 23, is shown in FIG. 10. In this design, the outer ratchet teeth, comprised of outer-ratchet-tooth surfaces 70 and 71, have been eliminated by arranging a slightly modified antibackup spring 72' to bear against inner-ratchet-tooth surfaces 61 and 63.

In an alternative embodiment (not shown) of the invention, slider return spring 52 could be eliminated by mechanically connecting slider 50 to arm 54 of driver 36 and utilizing the bidirectional motion of driver 36 to effect both the advancement and retraction of slider 50.

CAMERA OPERATION

To operate a photographic camera according to the preferred embodiment, a multilamp flash unit, or flashcube, is inserted in socket 23 with a fresh lamp in operating position.

If an unexposed frame of film is not already in its exposure position with respect to lens axis 22, the film is advanced by moving film-winding lever 30 counterclockwise to its position shown in FIG. 8, thereby advancing an unexposed film frame along the film plane and, at the same time, setting the camera shutter by cocking driver 36 through cocking pin 35. Simultaneously, the socket indexing slider 50 is moved to the right, as illustrated in FIG. 8, against the bias of slider return spring 52, during which movement slider 50 is held in its indexing position by the engagement of member 64 with tab 51 and inner-ratchet-tooth surface 63, whereupon socket 23 and the inserted flashcube are rotated to place the next flashlamp in firing position, such placement being aided by the engagement of antibackup spring 72 with outer-ratchet-tooth surface 71.

At this point, winding lever 30 is permitted to return to its initial position, shown in FIGS. 2, 4, and 6, by a return spring (not shown), and the camera is ready for operation with augmenting flash.

When camera 20 has thus been set, flexible spring drive member 64 serves as a detenting means to aid manual positioning of an inserted flashcube. Should the flashcube and socket be manually rotated in either direction of rotation, member 64 will become flexed by the force of the inner-ratchet-tooth surfaces bearing against it, and, up to approximately 15° of rotation, member 64 will return the socket to its normal, operative orientation. Such use of drive member 64 to provide detenting action eliminates any need to overcome the additional resistance of a separate detent.

Figure 5:
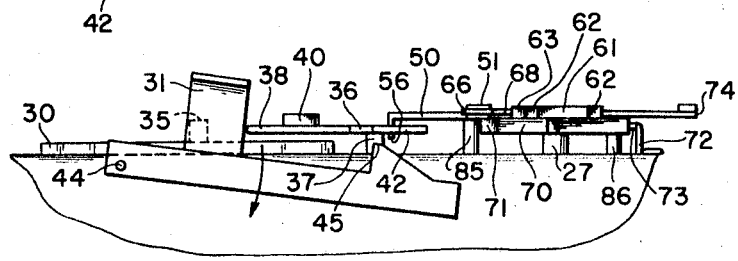

Camera operation is accomplished by aiming the camera toward the subject to be photographed and depressing shutter-trigger member 31, in the direction of the arrow shown in FIG. 5, to its fully depressed position. This motion of member 31 releases cocked driver 36, arm 42 of which then rapidly strikes the aforementioned ear of the shutter blade (not shown) to cause the shutter blade to uncap the diaphragm aperture for the predetermined exposure time. Simultaneously, arm 42 may actuate a flash synchronizer to fire the positioned lamp in timed relationship with the uncapping of the exposure aperture to take the flash picture.

Figure 7:
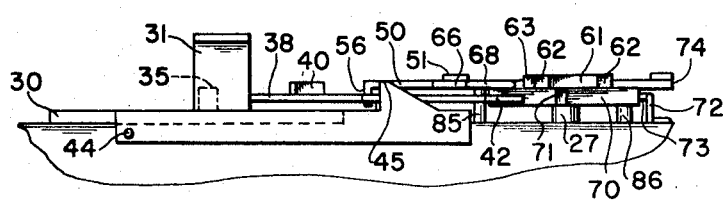

Also as cocked driver 36 is released, arm 54 thereof swings rapidly to the left, as viewed in FIGS. 4 and 6, thereby releasing slider 50 to move leftward, under the biasing influence of slider return spring 52, as indicated by the arrow shown in FIG. 4. Such motion of slider 50 causes portion 68 of member 64 to slide leftward along inner-ratchet-tooth surface 61 until portion 68 moves beyond the leftmost extremities of surfaces 61 and 62, at which point the spring tension in member 64 causes end portion 66 thereof to move away from tab 51 to the position shown in FIG. 6. During this movement of portion 68 on surfaces 61 and 62, disc 60 of socket 23 is restrained from counterclockwise movement by the force of antibackup spring 72 against outer-ratchet-tooth surface 71. FIGS. 6 and 7 show the several elements after they have come to rest in their released, or uncocked, positions, driver 36 having been stopped by pin 76 attached to camera body 21.

As can now be seen, by controlling all operations through a Y-shaped shutter driver having three arms, the invention ensures that the flashcube socket will always be indexed in correct relation with the remaining camera operating mechanisms while maintaining the advantage of having a preset socket position prior to exposure.

The invention has been described in detail with particular reference to a preferred embodiment thereof, but it will be understood that variations and modifications can be effected within the spirit and scope of the invention as described hereinabove and as defined in the appended claims.

We claim:

1. In a camera having a film-winding mechanism, a movable socket for receiving a device having a plurality of ignitable lamps in succession, and a shutter, a socket indexing mechanism comprising:

socket drive means for sequentially moving the socket to place successive ones of the lamps of a received device in a position for igniting the one lamp; and a shutter driver pivotally movable about a fixed point between a set position and a released position, the shutter driver including first abutment means engageable by the film-winding mechanism to move the shutter driver to the set position in response to film-winding, means engageable with the shutter to operate the shutter in response to movement of the shutter driver from the set position to the released position, and an abutment portion engageable with the socket drive means for indexing the socket in response to movement of the shutter driver to the set position, and thereby to move a successive lamp of a received device into a position for ignition.

2. The indexing mechanism claimed in claim 1 further comprising a camera operating member movable between a first position and a second position, the operating member engaging the shutter driver to retain the shutter driver in the set position when the operating member is in the first position, the operating member becoming disengaged from the shutter driver to permit movement of the shutter driver to the released position when the operating member is moved to the second position.

3. In a camera having a film-winding mechanism, a shutter, and a movable socket for receiving a device having a plurality of ignitable lamps, and wherein the socket includes means defining a plurality of first ratchet teeth, a socket indexing mechanism comprising:

socket drive means including a slider movable in a first direction for sequentially moving the socket to place successive ones of the lamps of a received flash device in a position for igniting the one lamp, the slider having a flexible drive member engageable with the first ratchet teeth to move the socket in an indexing direction upon movement of the slider in the first direction;

a shutter driver movable between a set position and a released position, the shutter driver including means engageable by the film-winding mechanism to move the shutter driver to the set position in response to film-winding, means engageable with the shutter to operate the shutter in response to movement of the shutter driver from the set position to the released position, and an abutment portion engageable with the socket drive means for moving the slider in the first direction to effect movement of the socket in response to movement of the shutter driver to the set position and thereby to move a successive lamp of a received device in a position for ignition.

4. The indexing mechanism claimed in claim 3 further comprising biasing means urging the slider in a second direction in response to movement of the shutter driver from the Set position to the released position.

5. The indexing mechanism claimed in claim 3 wherein the socket includes a positioning surface and he flexible drive member engages the surface of the socket to facilitate the positioning of an inserted multilamp flash attachment in a position for ignition.

6. The indexing mechanism claimed in claim 5 wherein the socket further includes means defining a plurality of second ratchet teeth and the camera includes a pawl engageable with the teeth to prevent movement of the socket in a direction opposite to the indexing direction upon movement of the slider in the second direction.

7. In a camera having a rotatable socket for receiving and indexing a multilamp flash device, the improvement comprising:

an indexing member rotatable with said socket, said member having a cross section in the shape of a square, each corner of said square having a ratchet protrusion;

a slider mounted for reciprocal sliding movement in a straight line path between first and second positions;

an elongated spring having a main section elongated in a direction generally parallel to said straight line path and at least first and second bends, said bends being in opposition to each other and said first bend forming a first leg generally transverse to said straight line path and said second bend forming a second leg generally parallel to said main section but displaced from it by said first leg;

said spring being secured to said slider at one end with the resilience of said spring urging said second leg against said indexing member;

means for moving said slider from said first position to said second position to move said spring therewith and said first leg in said spring into indexing engagement with one of said ratchet protrusions on said indexing member; and means for return moving said slider from said second position to said first position to move said first leg of said spring to a position to engage the next protrusion of said square-shaped indexing member, with said parallel leg sliding on the square side of said member between said protrusions during said return movement.